United States Patent Office 3,499,047
Patented Mar. 3, 1970

3,499,047
STABILIZED COMPOSITIONS
Charles L. Cormany, Wadsworth, William R. Dial, Akron, and Blaine O. Pray, Wadsworth, Ohio, assignors, by mesne assignments, to PPG Industries, Inc., a corporation of Pennsylvania
No Drawing. Filed Feb. 3, 1958, Ser. No. 712,693
Int. Cl. C07c 17/40
U.S. Cl. 260—652.5
1 Claim This invention relates to the stabilization of methylchloroform. More particularly, it deals with the protection of methylchloroform against decomposition, reduction of its corrosive action, particularly on metals, and avoidance of other such instability as is evidenced by methylchloroform during its normal use.

Methylchloroform, 1,1,1-trichloroethane, is a normally liquid chlorinated hydrocarbon valuably employed as an industrial solvent for any of a wide number of applications. One principal use is as a liquid phase degreasing solvent. Metal articles are immersed in liquid methylchloroform to remove from the article greases, oils and the like in liquid degreasing. In such usage, methylchloroform evidences a strong tendency to decompose. This decomposition is particularly alarming with light metals such as aluminum, magnesium and their alloys, especially when traces of water are present. Within all too short a period, decomposition occurs to such an extent that the methylchloroform loses its practical value and also may damage the metals being treated.

Another important use for methylchloroform is as a vapor pressure depressant in conjunction with aerosol. It serves to reduce the pressure in a closed metal container of the aerosol. Because of its peculiar nature, methylchloroform corrodes the metal container, especially if water is present. It also decomposes under these conditions of use.

A still further use to which methylchloroform may be put is as a vapor phase degreasing solvent. In this type of degreasing, vaporized methylchloroform contacts metallic articles from which oils, greases and the like are removed. Serious decomposition or other degradation of methylchloroform occurs during vapor degreasing which, unless counteracted or otherwise minimized, is a significant deterrent to its usefulness as an effective vapor degreasing solvent.

These and other problems of stability, including decomposition, corrosiveness and the like, especially those which arise in connection with the industrial uses of methylchloroform are quite serious. Unless they are overcome or substantially minimized, methylchloroform cannot be used with complete effectiveness and efficiency.

Methylchloroform presents its own unique difficulties regarding stabilization. Thus, experiences in the stabilization of other halogenated hydrocarbons are not applicable.

It has now been discovered, in accordance with this invention, that methylchloroform may be stabilized so as to reduce or eliminate, among other things, its corrosiveness, tendency to decompose and the like by incorporating therein a minor concentration, up to about 10 percent by weight thereof, preferably from 0.05 to 5 weight percent, of certain compounds. By providing a methylchloroform composition containing a stabilizing concentration of one or more such compounds, its corrosiveness, tendency to decompose and other disadvantages, especially those observed during its use may be obviated or minimized to the extent that they are no longer serious. Methylchloroform stabilized in this manner is of enhanced value.

Compounds which may be used to provide in methylchloroform one or more of the desired stabilizing effects are:

Ketones, including aliphatic, cycloaliphatic and aralkyl ketones, such as:

Acetone
 Methyl ethyl ketone
 Methyl n-propyl ketone
 Methyl isopropyl ketone
 Diethyl ketone
 Hexanone-2
 Hexanone-3
 Methyl t-butyl ketone
 Methyl isobutyl ketone
 Di-n-propyl ketone
 Diisopropyl ketone
 Diisobutyl ketone
 Acetyl acetone
 Mesityl oxide
 Phorone
 Cyclohexanone
 Acetophenone.

Ketols (ketone alcohols) such as:

Acetol
 4-hydroxy 2-butanone
 5-hydroxy 3-pentanone.

Sulfoxides such as:

Dimethyl sulfoxide
 Diethyl sulfoxide
 Methyl ethyl sulfoxide
 Di-n-propyl sulfoxide
 Di-n-butyl sulfoxide
 Diisopropyl sulfoxide.

Nitriles such as:

Acetonitrile
 Malonylnitrile
 Alkylaminoalkylcyanides, among which are illustrated by:

Dimethylaminoacetonitrile
 Methylaminopropionitrile
 Dimethylaminopropionitrile
 Diethylaminoacetonitrile
 Methylethylaminoacetonitrile
 Thiodipropionitrile
 Acrylonitrile.

Imines such as:

Alkyleneimines, e.g., ethyleneimine, propyleneimine
Hydroxy propyleneimine
Butadiene oxideimine
N-alkyl substituted alkyleneimines, including N-ethylethyleneimine, N-ethylpropyleneimine, N-methylpropyleneimine.

Oxaziranes, thioaziranes, oxaphosphiranes and thiophosphiranes of the formula $$R-C\underset{Z}{\overset{}{\diagdown\!\!\!\!\diagup}}Y$$

wherein Y is nitrogen or phosphorous and Z is oxygen or sulfur and R is a lower alkyl group of 1 to 4 carbon atoms, e.g., methyl, ethyl, propyl, isopropyl, n-butyl or isobutyl group.

Trialkylsilylethers, including trimethylsilylethers of the type trimethylsilylisopropylether, trimethyl butylether, triethylisopropylether.

Dialkyl sulphides, such as dimethyl sulphide, diethyl sulphide, methyl ethyl sulphide, dipropyl sulphide, di-isopropyl sulphide.

Dialkyl sulphites, e.g., dimethyl sulphite, diethyl sulphite, ethyl methyl sulphite, dipropyl sulphite.

Tetraalkyl leads, such as tetraethyl lead, tetramethyl lead, and corresponding polyalkyl tin or like metal compounds such as tetraethyl tin, tetramethyl tin, triethyl tin, diethyl tin.

Other useful compounds are:

Morpholines, such as morpholine and N-alkylmorpholines, including N-methylmorpholine
Nitroalkanes, including nitromethane, nitroethane, nitropropane
Hydrazine
Hydroxylamine
Organic derivatives of hydroxylamine, such as

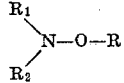

wherein $R_1$, $R_2$ and R are lower alkyl groups of 1 to 4 carbon atoms and $R_1$ and/or $R_2$ may also be hydrogen.
Organic derivatives of hydrazine, such as phenylhydrazine, hydroxyethylhydrazine, and those having the chemical structure

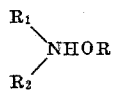

wherein R, $R_1$ and $R_2$ are alkyl groups of 1 to 4 carbon atoms and/or wherein $R_1$ and $R_2$ may be hydrogen.
Dioxolane
Methylethanolamine and like hydroxyamines, including ethylethanolamine.

It has further been found particularly that combinations of one or more of the above compounds with alcohols, especially monohydric aliphatic alcohols, or organic epoxides (oxirane compounds, those compounds having an oxygen atom linked to two adjacent linked carbon atoms, e.g., the group

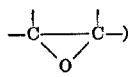

are especially useful in the stabilization of methylchloroform. These alcohols and epoxides are in themselves capable of imparting stabilizing properties.

Among these alcohols are:

Methanol
Ethanol
Isopropanol
n-Butanol
Propanol

Organic epoxides include:

Ethylene oxide
Propylene oxide
Glycidol
Butylene oxides (each isomer or an isomeric mixture)
Epichlorohydrin
Styrene oxide
Cyclohexene oxide.

Combinations of dimethyl sulfoxide or like dialkyl sulfoxide with an epoxide such as glycidol and acetol with a lower aliphatic monohydric alcohol or epoxide such as glycidol are especially effective.

When more than one compound is employed for stabilizing purposes, the total concentration of these compounds should be between 0.05 and 10 percent, preferably less than 6 percent, by weight of the methylchloroform. The concentration of the individual component in such stabilizing may be varied. Usually, the respective constituents are in equal weight concentrations. However, this is not essential and one constituent may be used in greater concentration.

The following examples illustrate the stabilizing effect of various compounds:

Example I

The test procedure used to evaluate the stabilizing effect of various compounds in methylchloroform involved placing 50 cubic centimeters of methylchloroform in a 250 cubic centimeter glass flask and thereafter refluxing, under atmospheric conditions, the methylchloroform under total reflux. As indicated in Table I, hereinafter, small strips of aluminum (½ inch by ½ inch polished aluminum) were included in the bottom of the flask and, hence, immersed in the boiling methylchloroform. The stabilizing compound was included in the methylchloroform charged to the flask in the concentration indicated in Table I. Refluxing was continued until the stabilizing effect of the compound or mixture of compounds was no longer observed as indicated either by the formation of tars, evolution of hydrogen chloride and appearance of precipitates.

Without the use of a stabilizer, methylchloroform in the presence of aluminum strips turned black (indicating undesirable decomposition) after about 5 minutes of refluxing.

The following Table I lists various tested compounds and their observed stabilizing effect:

TABLE I

| Stabilizer Name | Concentration, percent by weight | Total reflux time before decomposition (hours) |
|---|---|---|
| None | | 0.1 |
| Acetol | 1.0 | 1 109 |
| β-Methylaminopropionitrile | 1.0 | 1 134 |
| Malononitrile | 1.0 | 16.3 |
| Thiodipropionitrile | 1.0 | 93 |
| Dimethylaminoacetonitrile | 1.0 | 52.6 |
| Dimethylaminopropionitrile | 1.0 | 1 134 |
| Dimethyl sulfoxide | 1.0 | 80.1 |
| Glycidol | 0.01 | |
| Acetol | 1.0 | 1 84.0 |
| Glycidol | 0.01 | |
| Morpholine | 1.0 | 80.0 |
| Glycidol | 0.01 | |
| Methylethanolamine | 1.0 | 60.0 |
| Do | 1.0 | 40.0 |
| Glycidol | 0.01 | |
| Hydrazine | 1.0 | 16.0 |
| Dioxolane | 3.0 | 140 |
| Do | 3.0 | 84 |
| Butylene oxide | 1.0 | |
| Dioxolane | 3.0 | 1 140 |
| Ethanol | 3.0 | |
| Dioxolane | 3.0 | 1 140 |
| Isopropanol | 3.0 | |
| Acetone | 3.0 | 35 |
| Nitromethane | 3.0 | 1 104 |
| Do | 3.0 | 1 140 |
| Butylene oxide | 1.0 | |
| Nitromethane | 3.0 | 43 |
| Ethanol | 3.0 | |
| Nitromethane | 3.0 | 1 140 |
| Isopropanol | 3.0 | |
| Ethanol | 3.0 | 11 |
| Acetonitrile | 3.0 | 1 184 |
| Do | 3.0 | 1 184 |
| Butylene oxide | 1.0 | |
| Acrylonitrile | 3.0 | 1 144 |
| N-methylmorpholine | 1.0 | 1 52 |
| Do | 1.0 | 1 52 |
| Glycidol | 0.01 | |
| Morpholine | 5.0 | 20 |

1 Testing stopped; no decomposition occurred during this time interval.

Example II

A further test procedure involved filling a small glass vial with about 20 cubic centimeters of methylchloroform (including sabilizer as indicated below) and one cubic centimeter of water and stoppering the vial after placing in the vial a mild steel test strip (½ inch by 2 inches by 1/16 inch) such that it was both immersed in the liquid and exposed to the atmosphere of the vial. This vial was then set aside and corrosion of the steel submerged in the liquid, at the liquid interface and in the atmosphere of the vial was observed as a function of time.

The following Table II lists results of such tests with various compounds:

TABLE II

| Stabilizer | | Appearance of steel strip after 192 hours | | |
|---|---|---|---|---|
| Name | Concentration, percent by weight | Liquid Phase | Vapor Phase | Interface |
| None | | Sl. rust | Sl. rust | Sl. rust. |
| Glycidol | 1.0 | Clean | Clean | Clean. |
| Dimethyl Sulfoxide | 1.0 | do | do | Do. |
| Glycidol | 0.01 | | | |
| Pyridine | 1.0 | Clean | Clean | Clean. |
| Butylene Oxide | 0.25 | | | |
| N-methylmorpholine | 1.0 | Clean | Clean | Clean. |
| Glycidol | 0.01 | | | |
| Methylaminopropionitrile | 1.0 | Clean | Clean | Clean. |
| Dimethylaminopropionitrile | 1.0 | do | do | Do. |
| Thiodipropionitrile | 1.0 | do | do | Do. |
| Dimethylaminoethanol | 1.0 | do | do | Do. |
| Methylethanolamine | 1.0 | do | do | Do. |
| Do | 1.0 | do | do | Do. |
| Glycidol | 0.01 | | | |
| Acetonitrile | 3.0 | Clean | Clean | Clean. |
| Methylethanolamine | 1.0 | | | |
| Dimethylaminoacetonitrile | 1.0 | Clean | Clean | Clean. |
| Methylmorpholine | 1.0 | do | do | Do. |
| Acetonitrile | 1.0 | Sl. rust | do | Do. |
| Morpholine | 0.01 | | | |

While the invention has been described with reference to specific details of certain embodiments, it is not intended that it be construed as limited to such details except insofar as they are recited in the appended claim.

We claim:
1. Methylchloroform containing from 0.05 to 5 percent acrylonitrile by weight.

References Cited

UNITED STATES PATENTS

| | | | |
|---|---|---|---|
| 2,811,252 | 10/1957 | Bachtel | 260—652.5 |
| 2,371,644 | 3/1945 | Petering et al. | 260—652.5 |
| 2,371,645 | 3/1945 | Aitchison et al. | 260—652.5 |
| 2,043,257 | 6/1936 | Missbach | 260—652.5 |
| 2,043,260 | 6/1936 | Missbach | 260—652.5 |

LEON ZITVER, Primary Examiner

HOVARD T. MARS, Assistant Examiner

U.S. Cl. X.R.

252—172